(12) United States Patent
Miyauchi (10) Patent No.: US 11,120,530 B2
(45) Date of Patent: Sep. 14, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Takashi Miyauchi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 324 days.

(21) Appl. No.: 15/977,383

(22) Filed: May 11, 2018

(65) Prior Publication Data

US 2018/0336665 A1 Nov. 22, 2018

(30) Foreign Application Priority Data

May 22, 2017 (JP) .............................. JP2017-101110

(51) Int. Cl.
*G06T 5/00* (2006.01)
*H04N 1/407* (2006.01)
(Continued)

(52) U.S. Cl.
CPC .............. *G06T 5/005* (2013.01); *G06T 5/003* (2013.01); *G06T 5/006* (2013.01); *H04N 1/407* (2013.01);
(Continued)

(58) Field of Classification Search
CPC ........... G06T 2207/10024; G06T 5/003; G06T 5/005; G06T 5/006; G06T 2207/20012; G06T 2207/20021; G06T 5/008; G06T 5/40; G06T 7/194; H04N 1/407; H04N 1/58; H04N 1/6002; H04N 1/6008; H04N 1/6027; H04N 1/62; H04N 1/4072; H04N 1/4074; H04N 1/603; H04N 1/6086;
(Continued)

(56) References Cited

U.S. PATENT DOCUMENTS

| | | | |
|---|---|---|---|
| 5,132,786 A | 7/1992 | Ishiwata | |
| 6,873,436 B1 * | 3/2005 | Terada | .................. H04N 1/644 358/1.9 |

(Continued)

FOREIGN PATENT DOCUMENTS

| | | |
|---|---|---|
| CN | 101945327 A | 1/2011 |
| CN | 102714737 A | 10/2012 |

(Continued)

*Primary Examiner* — Michael J Vanchy, Jr.
(74) *Attorney, Agent, or Firm* — Canon U.S.A., Inc. IP Division (57) ABSTRACT

An image processing apparatus includes an acquisition unit configured to acquire an image, an image processing unit configured to perform image processing on the acquired image, and an output unit configured to output the image having undergone the image processing to an output destination. The image processing unit is able to perform replacement processing for replacing colors of predetermined image portions in the acquired image with a color selected from a plurality of predetermined different colors based on the colors of the predetermined image portions. The output unit is able to output the acquired image having undergone the replacement processing to the output destination, and to output the image not having undergone the replacement processing to the output destination.

10 Claims, 8 Drawing Sheets

(51) Int. Cl.
  *H04N 1/60* (2006.01)
  *H04N 1/62* (2006.01)
  *H04N 1/58* (2006.01)
(52) U.S. Cl.
  CPC ............ *H04N 1/6027* (2013.01); *H04N 1/62* (2013.01); *G06T 2207/10024* (2013.01); *H04N 1/58* (2013.01); *H04N 1/6002* (2013.01); *H04N 1/6008* (2013.01)
(58) Field of Classification Search
  CPC ... H04N 2201/0094; H04N 2201/0096; G06K 9/38; G06K 2209/01
  See application file for complete search history.

(56) References Cited

U.S. PATENT DOCUMENTS

| | | | | |
|---|---|---|---|---|
| 2002/0008760 | A1* | 1/2002 | Nakamura | H04N 5/217 348/222.1 |
| 2004/0174565 | A1* | 9/2004 | Ito | H04N 1/4072 358/2.1 |
| 2008/0007746 | A1* | 1/2008 | Hagiwara | H04N 1/603 358/1.9 |
| 2008/0025605 | A1* | 1/2008 | Suino | G06K 9/38 382/173 |
| 2011/0209044 | A1* | 8/2011 | Kutsumi | G06T 11/60 715/232 |
| 2013/0343609 | A1* | 12/2013 | Wilson | G06K 9/3283 382/103 |
| 2014/0198351 | A1* | 7/2014 | Keithley | H04N 1/40062 358/474 |
| 2015/0229855 | A1 | 8/2015 | Talvala | |
| 2015/0326752 | A1* | 11/2015 | Hayasaki | G06T 5/008 358/522 |
| 2017/0300179 | A1* | 10/2017 | Hara | G09G 5/06 |

FOREIGN PATENT DOCUMENTS

| | | |
|---|---|---|
| CN | 104412299 A | 3/2015 |
| CN | 104869380 A | 8/2015 |
| EP | 3054662 A1 | 8/2016 |
| EP | 3119074 A1 | 1/2017 |
| JP | H02224569 A | 9/1990 |
| JP | 2000013613 A | 1/2000 |
| JP | 2013058966 A | 3/2013 |
| JP | 2017-22620 A | 1/2017 |

* cited by examiner

| IMAGE HAVING UNDERGONE DISTORTION CORRECTION | OUTPUT IMAGE IN FIRST IMAGE CORRECTION MODE |
|---|---|
| *801*  ~805 | *802*  ~806 |
| OUTPUT IMAGE IN SECOND IMAGE CORRECTION MODE | OUTPUT IMAGE IN THIRD IMAGE CORRECTION MODE |
| *803*  ~807 | *804*  ~808 |

IMAGE PROCESSING APPARATUS, IMAGE PROCESSING METHOD, AND STORAGE MEDIUM

BACKGROUND

Field of the Disclosure

The present disclosure generally relates to image processing and, more particularly, to an image processing apparatus, an image processing method, a storage medium, and a technique for monochromatizing similar color portions included in an image with a predetermined color.

Description of the Related Art

In recent years, there has been an increase in the number of portable terminals having advanced information processing functions, such as smart phones and tablet personal computers (PCs). These portable terminals are provided with a camera and an image capturing function (camera function). It has become common that a user of such a portable terminal uses the camera function to capture an image of a paper surface or a white board surface with texts written thereon, and stores the image as image data in a memory of the portable terminal.

Unlike document scanning with a scanner having a document feeder or document positioning plate, image capturing by using the camera function of a portable terminal is subjected to varying environmental conditions such as the image capturing direction and light source condition. Therefore, a document image may be geometrically distorted or unneeded objects other than the paper surface or white board surface may be included in a captured image, because an image is captured in an oblique direction. Conventionally, an area on the paper surface or while board surface is clipped from the captured image and then distortion correction (sometimes referred to as trapezoidal correction) is performed on the clipped area. Thus, the geometrically distorted image in a document area is corrected into a rectangular shape.

Japanese Patent Application Laid-Open No. 2017-22620 discusses a technique for estimating a shade component (brightness unevenness due to the influence of environment light and shade included in a captured image) in a captured image and removing the shade component from the captured image based on information about the estimated shade component.

The technique discussed in Japanese Patent Application Laid-Open No. 2017-22620 makes it possible to remove the shade component from the captured image. However, even an image having undergone the shade component removing processing may include different foreground colors which are originally the same color on the document. On the other hand, however, advancements in image processing technology would be beneficial because, for example, monochromatizing such foreground portions is not desirable in a case where importance is attached to the originality of the document (similarity in appearance to the document) while maintaining minute color differences.

SUMMARY

Accordingly, advancements in image processing technology may be achieved through the present disclosure, where an improvement in visibility may be achieved by replacing or monochromatizing foreground portions having colors within a predetermined color range (for example, reddish colors) into a predetermined color (for example, a color having only the red component), i.e., unifying foreground portions having similar colors into a single color. Advancements in image processing technology in the present disclosure have been devised based in part on the above-described situation, and are generally related to making it possible to output an image having undergone predetermined replacement processing to an output destination, and to output an image not having undergone the predetermined replacement processing to the output destination.

According to one or more aspects of the present disclosure, an image processing apparatus includes an acquisition unit configured to acquire an image, an image processing unit configured to perform image processing on the acquired image, and an output unit configured to output the image having undergone the image processing to an output destination. The image processing unit is able to perform replacement processing for replacing colors of predetermined image portions in the acquired image with a color selected from a plurality of predetermined different colors based on the colors of the predetermined image portions. The output unit is able to output the acquired image having undergone the replacement processing to the output destination, and to output the image not having undergone the replacement processing to the output destination.

Further features of the present disclosure will become apparent from the following description of exemplary embodiments with reference to the attached drawings.

DESCRIPTION OF THE EMBODIMENTS

Exemplary embodiments for embodying the present disclosure will be described below with reference to the accompanying drawings.

<Configuration of Portable Terminal>

Figure 1A:
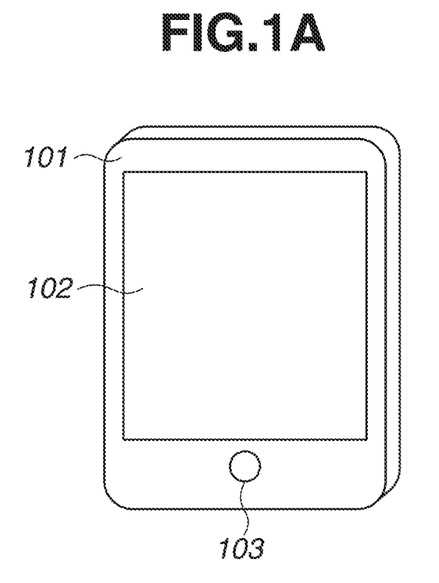
FIGS. 1A and 1B are general views illustrating a portable terminal according to a first exemplary embodiment.
Figure 1B:
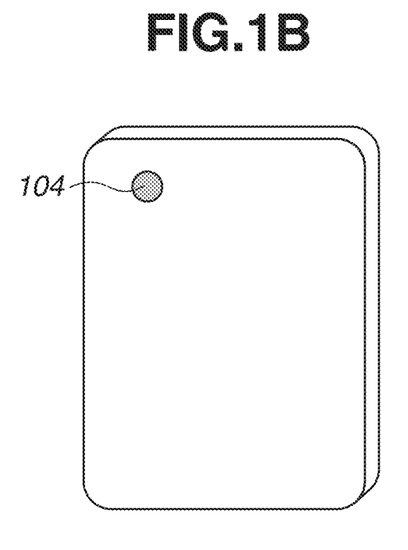

FIGS. 1A and 1B illustrate an outer appearance of a portable terminal (image processing apparatus and information processing apparatus) 101 according to a first exemplary embodiment. FIG. 1A illustrates an outer appearance of the front side of the portable terminal 101, which includes a touch panel display 102 and an operation button 103. FIG. 1B illustrates an outer appearance of the back side of the portable terminal 101, which includes a camera 104. The camera 104 is equipped with an autofocus mechanism (not illustrated) which enables measuring the focal length and subject distance.

The present exemplary embodiment is applicable to a portable terminal having an image capturing function (camera function). For example, the present exemplary embodiment is applicable to not only a smart phone (mobile phone), tablet terminal, and personal computer (PC) having an image capturing function (camera function) but also a digital camera having a touch panel display. The present exemplary embodiment is also applicable to a PC wiredly or wirelessly connected with a camera. A portable terminal or PC may read an image from a storage device (such as a memory card) storing images captured by a camera and perform processing according to the present exemplary embodiment.

Figure 2:
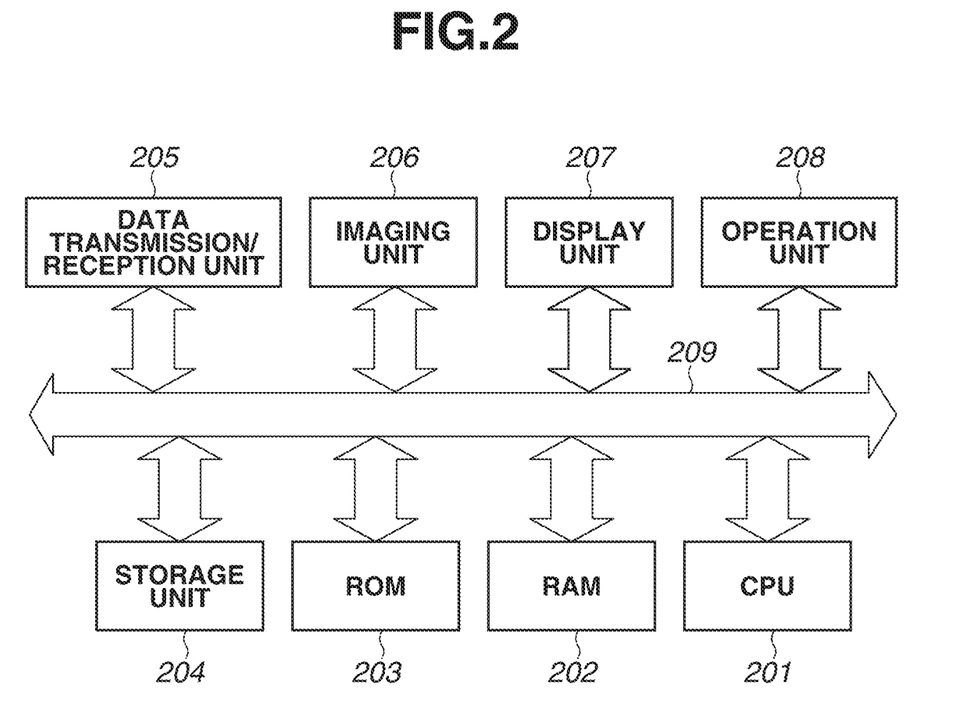
FIG. 2 is a block diagram illustrating an overall configuration of the portable terminal according to the first exemplary embodiment.

The hardware configuration of the portable terminal 101 is illustrated in FIG. 2. However, this configuration is an example configuration for embodying the present exemplary embodiment, and the hardware configuration is not limited thereto.

Referring to FIG. 2, a central processing unit (CPU) 201, a random access memory (RAM) 202, and a read only memory (ROM) 203 may transmit and receive programs and data via a data bus 209. A storage unit 204, a data transmission/reception unit 205, an imaging unit 206, a display unit 207, and an operation unit 208 may be connected to the data bus 209. The CPU 201, the RAM 202, and the ROM 203 may also mutually transmit and receive programs and data.

The storage unit 204 may be a flash memory for storing images and various programs for implementing flowcharts (described below).

The data transmission/reception unit 205 may include a wireless local area network (LAN) controller to implement data transmission and reception with an external apparatus such as an external server and external printer.

The imaging unit 206 is the camera 104 which captures a white board to acquire a captured image. Data of the acquired captured image is supplied with header information including a manufacture name, model name, image resolution, aperture value (f-number), and focal length, and is transmitted to each unit as described below.

The display unit 207 as a display of the touch panel display 102 displays a live view image when a white board is captured by using the camera function.

The operation unit 208 including a touch panel of the touch panel display 102 and the operation button 103 receives an operation from the user and transmits information about the operation to each unit.

The CPU 201, which may include one or more processors and one or more memories, may control these components in the portable terminal 101 by executing a computer program stored in the ROM 203 or the storage unit 204.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

<Detailed Description of Present Exemplary Embodiment with Reference to Flowcharts>

Figure 3:
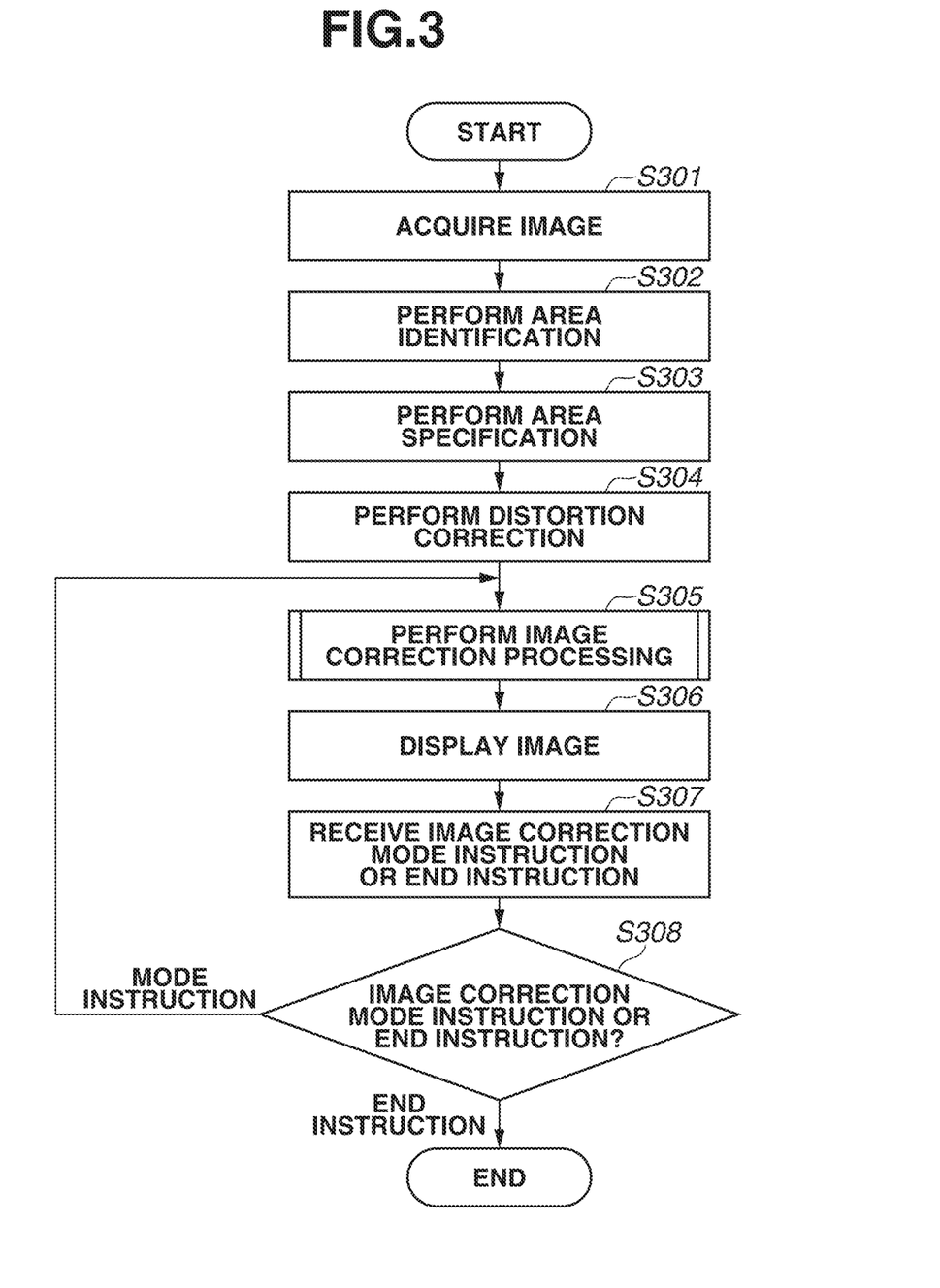
FIG. 3 is a flowchart illustrating a processing procedure according to the first exemplary embodiment.
Figure 4A:
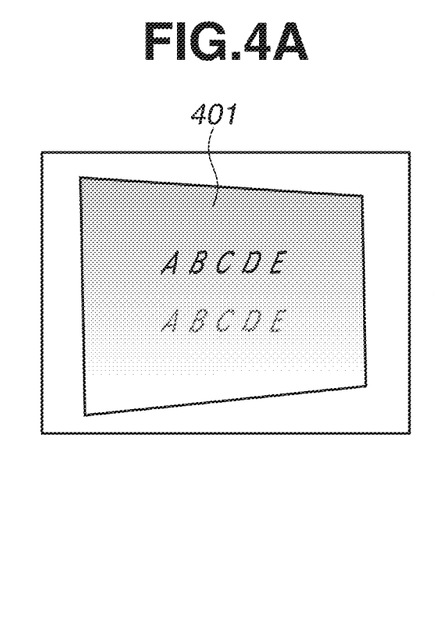
FIGS. 4A, 4B and 4C illustrate frame detection processing, frame specification, and distortion correction processing according to the first exemplary embodiment.
Figure 4B:
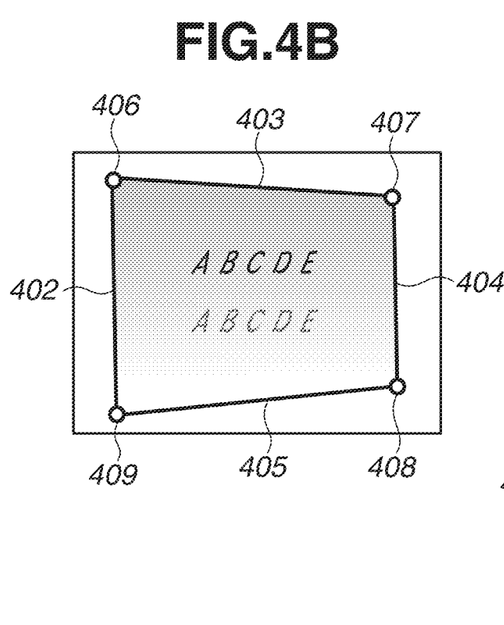
Figure 4C:
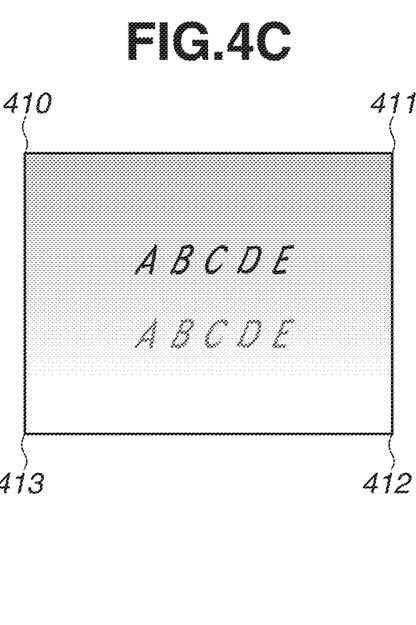

FIG. 3 is a flowchart illustrating a processing procedure performed by the portable terminal 101 according to the present exemplary embodiment. FIGS. 4A, 4B and 4C illustrate a flow of processing for clipping an area of a white board surface from a captured image, as an example case where the white board surface is captured as a subject. When the CPU 201 (computer) of the portable terminal 101 loads a processing program stored in the ROM 203 into the RAM 202 and executes the program, the CPU 201 may function as a processing unit for performing processing of each step of the flowchart illustrated in FIG. 3. The CPU 201 may function as a processing unit when a processing program acquired from outside via the data transmission/reception unit 205 is stored in the storage unit 204, loaded into the RAM 202, and then executed. The present exemplary embodiment is supposed to be used for an application with which a user operates the portable terminal 101 for capturing a paper surface and a white board surface as a subject, clipping only the subject's area from the captured image, correcting the clipped area, and outputting the corrected image to an output destination specified by the user. The output destination may be specified in advance by the user, or may be specified by the user after an end instruction is received in step S308 (described below).

In step S301, the CPU 201 acquires an image selected or captured by the user as an input image. In a case where an input image is selected, the CPU 201 acquires, via the data bus 209, the image selected via the operation unit 208 by the user, out of images stored in the storage unit 204 or a memory card. In a case where an input image is captured, the CPU 201 acquires, via the data bus 209, the image captured by the imaging unit 206 in response to an image capturing instruction issued via the operation unit 208 by the user. FIG. 4A illustrates an input image including a white board surface 401.

In step S302, the CPU 201 performs area identification processing for identifying a quadrangular area indicating the white board surface 401 from the input image acquired in step S301. The area identification processing is implemented by detecting a candidate line segment group (candidate side group) as a candidate for each side of the white board surface 401, and evaluating a quadrangle composed of a combination of the candidate line segment group. A method for detecting a candidate line segment group and a method for evaluating a quadrangle may be known methods. For example, a candidate line segment group is detected by using the Hough conversion algorithm in which edge information detected from the input image is projected on the polar coordinates to detect straight lines. A quadrangle may be evaluated based on geometric information including the ratio of the lengths of opposite sides, the magnitudes of inner angles, and the aspect ratio, and line segments constituting the quadrangle may be evaluated based on image information, for example, the comparison in tint and dispersion between the inside and the outside. Although, in the present exemplary embodiment, the area of the white board surface is identified, the area of a paper surface may be identified in a case where the subject is a paper surface.

In step S303, the CPU 201 displays the above-described input image with the quadrangular area detected in step S302 superimposed thereon, and performs area specification processing in which operations for changing (correcting) the shape of the displayed quadrangular area are received from the user. FIG. 4B illustrates the input image with the identified quadrangular area superimposed thereon. Sides 402, 403, 404, and 405 of the identified rectangular area serve as side handlers for receiving side position instructions from the user. Apexes 406, 407, 408, and 409 of the identified rectangular area serve as apex handlers for receiving apex position instructions from the user. The user is able to change the shape of the quadrangular area by selecting and operating the side and apex handlers.

In step S304, according to the quadrangular area specified in step S303, the CPU 201 extracts a part of the input image (the image included in the quadrangular area) and then performs distortion correction processing (geometric correction processing) to correct distortion of the extracted image to acquire a rectangular image. The distortion correction is performed by use of projection transformation in consideration of a case where the quadrangular area is distorted into a non-trapezoidal shape. A projection transformation matrix can be calculated by using a known method based on apex information (the apexes 406, 407, 408, and 409) about the quadrangular area in the input image, and coordinates information about the four corners 410, 411, 412, and 413 of the output image. In a case where the processing speed is prioritized, an affine transformation matrix or a simple magnification may be calculated as a magnification parameter. FIG. 4C illustrates an image resulting from the distortion correction.

In step S305, the CPU 201 performs the image correction processing on the image having undergone the distortion correction obtained in step S304. The image correction processing will be described in detail below with reference to FIGS. 5 and 6.

In step S306, the CPU 201 displays the image resulting from the image correction obtained in step S305 on the display unit 207.

In step S307, the CPU 201 receives, from the user, an image correction mode instruction (instruction for selecting the type of image correction) or an end instruction (instruction for finalizing a result of the image correction) via the operation unit 208.

In step S308, the CPU 201 determines whether the image correction mode instruction or the end instruction is received in step S307. In a case where the CPU 201 determines that the image correction mode instruction is received in step S307 (MODE INSTRUCTION in step S308), the processing returns to step S305. In step S305, the CPU 201 performs the image correction processing again. On the other hand, in a case where the CPU 201 determines that the end instruction is received in step S307 (END INSTRUCTION in step S308), the CPU 201 outputs the image having undergone the image correction processing to the output destination specified by the user (a specified folder in the storage unit 204, a specified external server, or a specified external printer). Then, the processing is terminated. In a case where the image is to be output to an external apparatus, the CPU 201 outputs the image via the data transmission/reception unit 205.

<Detailed Description of Image Correction Processing (S305)>

The image correction processing will be described in detail below with reference to FIG. 5. The input image as a processing target of this flowchart is an image having undergone the distortion correction processing in step S304.

In step S501, the CPU 201 acquires the image correction mode to determine the current mode. In a case where the CPU 201 executes step S501 next to step S304 illustrated in FIG. 3, the CPU 201 acquires a preset image correction mode (for example, a first image correction mode). In this case, the CPU 201 may acquire not the preset image correction mode but the image correction mode performed in the last execution of this application. On the other hand, in a case where the CPU 201 executes step S501 next to step S308 illustrated in FIG. 3, the CPU 201 acquires the image correction mode received in step S307. In a case where the acquired image correction mode is the first image correction mode (FIRST IMAGE CORRECTION MODE in step S501), the processing proceeds to step S502. On the other hand, in a case where the acquired image correction mode is the second image correction mode (SECOND IMAGE CORRECTION MODE in step S501), the processing proceeds to step S504.

Processing illustrated in steps S502 and S503 is correction processing in the first image correction mode, and processing illustrated in steps S504 to S506 is correction processing in the second image correction mode.

In step S502, the CPU 201 performs shade removing processing for removing illumination unevenness and brightness unevenness such as shades from the input image. The shade removing processing is implemented by generating a shade component image (pixel value correction information within an input image surface) in which illumination unevenness and brightness unevenness such as shades are estimated from the input image, and correcting the input image according to difference values between the input image and the shade component image. To generate a shade component image from the input image, the CPU 201 divides the input image into blocks and analyzes luminance values (brightness information) for each block. The CPU 201 calculates the pixel values of the red (R), green (G), and blue (B) components of a pixel having the maximum luminance value within each block, as representative pixel values. According to the present exemplary embodiment, an input image is divided into 32×32 blocks. In a case where a background area (for example, a white area of a paper document or white board) is included in blocks, shade components can be correctly acquired. On the other hand, in a case where no background area is included in blocks under the influence of a large object such as a photograph and drawing, it is difficult to acquire correct shade components. Therefore, for a block which is extremely dark compared with circumference blocks, the pixel values are corrected by using the representative values of circumference blocks. For example, in a case where the value obtained by subtracting the maximum luminance value of pixels in a certain block from the maximum luminance value of pixels in an adjacent block is equal to or larger than a predetermined value, the CPU 201 performs correction in such a way that the representative pixel value of the adjacent block is used as the representative pixel value of the certain block. In this way, one representative pixel value is obtained for each block of the input image. An image composed only of the calculated representative pixel values of respective blocks is a reduced version of the input image, having the number of pixels defined by the number of division blocks.

According to the present exemplary embodiment, there is obtained an image of 32×32 pixels having respective representative pixel values of 32×32 blocks. Then, the CPU 201 performs enlargement processing on this reduced image so that the image includes the same number of pixels as the input image, thus generating a shade component image. Then, the CPU 201 corrects the pixel values of the input image based on the shade component image and the input image. For example, the CPU 201 divides the pixel values of the input image by the pixel values of the shade component image, multiplies the quotient by a pixel value (luminance value) 255 indicating white, and sets the resultant values as corrected pixel values. Alternatively, the CPU 201 may divide the pixel values of the input image by a value obtained based on the difference between the pixel values of the shade component image and the pixel values of the input image, multiply the resultant value by 255, and sets the resultant values as corrected pixel values. As described above, the shade component image (pixel value correction information within the image surface) is obtained by analyzing the brightness information within the input image surface, and each pixel value of the input image is corrected based on the shade component image.

In step S503, the CPU 201 performs sharpening processing on the image having undergone the shade removing processing obtained in step S502. A known sharpening processing is applicable. For example, an 8-neighborhood filter implemented by the following factor (3×3 matrix) is applied to each pixel of the image having undergone the shade removing processing.

$$\begin{bmatrix} -1 & -1 & -1 \\ -1 & 9 & -1 \\ -1 & -1 & -1 \end{bmatrix} \quad (1)$$

As described above, the image obtained in this step is a correction result in the first correction mode.

In step S504, the CPU 201 performs the shade removing processing for removing illumination unevenness and brightness unevenness such as shades from the input image. Although the shade removing processing in this step may be similar to the processing in step S502, the CPU 201 performs the shade removing processing for making it easier to whiten the image according to the present exemplary embodiment. According to the present exemplary embodiment, in a shade removing processing procedure similar to the processing in step S502, the CPU 201 divides the input image into blocks with a smaller block size than that in step S502, i.e., 128×128 blocks. This makes it easier to estimate a shade component in the background area which rapidly changes in density. Further, the CPU 201 performs tone curve correction processing using an upwardly convexed tone curve to obtain a shade-removed image having a higher luminance of the shade-removed background area than the luminance of the shade-removed image obtained in step S502.

In step S505, the CPU 201 performs foreground extraction processing for extracting foreground areas such as text portions from the input image. The CPU 201 implements the foreground extraction processing by performing gray scale conversion on the input image and then performing binarization processing using a threshold value map image for representing, as an image, an arrangement of binarization threshold values for each pixel of the input image. Similar to the shade removing processing in step S504, the threshold value map image uses the shade component image estimated from the input image. The shade component image in step S505 differs from the shade component image in step S504 in that the luminance representation is used instead of the red, green, and blue (RGB) representation. The method for generating a threshold value map is not limited to the above-described method, and a known method is applicable. For example, a uniform threshold value for the entire image surface obtained through the Otsu method may be used as a threshold value map. For the sake of description, it is assumed that both a gray scale image and a threshold value map are composed of pixel values each of which is represented by 8 bits, and that the pixel value 0 indicates black and the pixel value 255 indicates white. An output binary image is composed of pixel values each of which is represented by 1 bit, and that the pixel value 0 indicates white and the pixel value 1 indicates black. In the case of coordinates (x, y), the pixel value of a gray scale image is represented by g(x, y), the pixel value of a threshold value map is represented by t(x, y), and the pixel value of the output binary image represented by b(x, y). The CPU 201 compares the pixel value g(x, y) of the gray scale image with the pixel value t(x, y) of the threshold value map in the case of coordinates (x, y) to determine whether the pixel value b(x, y) of the binary image is 0 or 1, and then generates a binary image.

When g(x, y)≥t(x, y), b(x, y)=0 (white pixel). When g(x, y)<t(x, y), b(x, y)=1 (black pixel).

An area represented by black pixels in the binary image obtained in this way is a foreground area representing a text portion or a photographic portion.

In step S506, the CPU 201 performs foreground correction processing for performing, for example, replacement processing or monochromatization (replacing a color of a portion with single color), on text portions out of the foreground areas extracted in step S505. The CPU 201 identifies text portions in the image having undergone the shade removing processing in step S504, by using the binary image obtained in step S505. More specifically, the CPU 201 performs labelling processing on black pixels extracted as foreground portions to extract adjacent black pixel groups as one area having the same label (labelling area). Then, the CPU 201 performs attribute determination to determine whether each area is a text portion or a non-text portion (for example, a photographic portion).

A known technique for attribute determination is applicable. For example, the CPU 201 calculates chromatic dispersions in the YUV color space (for example, the variance value of the U value and the variance value of the V value) of pixels in the image area having undergone the shade removing processing in step S504 corresponding to the labeling area. When the chromatic dispersion value is less than a threshold value (when a predetermined color condition is satisfied), the CPU 201 determines that the labeling area (and the corresponding image portion having undergone the shade removing processing) is a text portion. More specifically, the CPU 201 identifies image portions where similar colors are dominant (image portions having a comparatively large number of similar colors) in the image having undergone the shade removing processing. As another attribute determination method, for example, the CPU 201 counts the number of pixels having similar color difference values (U and V values having a difference within a range of a threshold value) for pixels in the image area having undergone the shade removing processing corresponding to the labeling area. In a case where the ratio of the number of pixels to the total number of pixels in the labeling area exceeds a threshold value (when a predetermined color condition is satisfied), the CPU 201 may determine that the labeling area is a text portion.

Then, the CPU 201 may replace or monochromatize labeling areas determined to be a text portion in the attribute determination processing. More specifically, the CPU 201 performs processing, such as replacement processing or monochromatization processing for replacing a color of the image portion where similar colors are dominant out of the image having undergone the shade removing processing with one of a plurality of prepared replacement colors (a plurality of predetermined different colors). According to the present exemplary embodiment, the plurality of predetermined colors includes black (R=G=B=0), red (R=255, G=B=0), blue (B=255, R=G=0), and green (G=255, R=B=0) which are representative colors for white board markers. A similar color area including none of these four colors may be replaced or monochromatized with the average color of the area. To determine this replacement color, the CPU 201 uses the average color, in the YUV color space, of the image portion having undergone the shade removing processing corresponding to each labeling area. More specifically, ranges of black, red, blue, and green in the YUV color space are predetermined. If the average color of the image portion having undergone the shade removing processing corresponding to each labeling area meets any one of the ranges of four prescribed marker colors, the CPU 201 sets one of the four colors as a replacement color. On the other hand, if the average color meets none of the ranges of the four prescribed marker colors, the CPU 201 sets the average color of the image portion as a replacement color. The CPU 201 may replace or monochromatize labeling areas with the replacement color determined in this way, and may overwrite the replaced or monochromatized labelling areas onto the image having undergone the shade removing processing obtained in step S504. More specifically, image portions corresponding to the labeling areas out of the image having undergone the shade removing processing may be replaced or monochromatized. This processing makes it easier to distinguish the colors of text portions and unify, with a single color, the colors of a plurality of texts which are originally represented in the same color. By performing smoothing processing only on contour portions of text portions (replaced or monochromatized portions), the CPU 201 can obtain an image having undergone the shade removing processing and the replacement or monochromatization only on text portions as a correction result in the second image correction mode.

Figure 6:
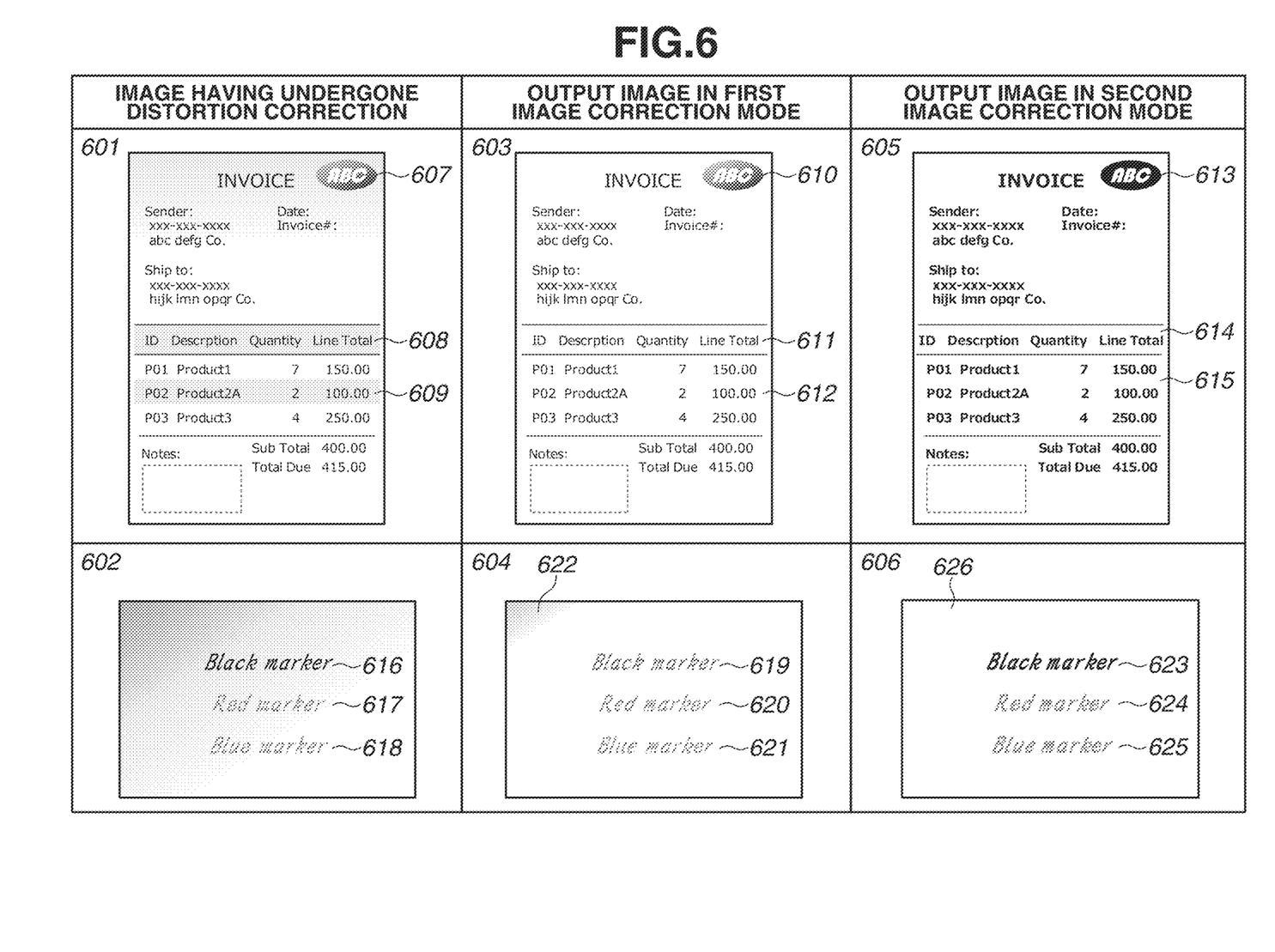
FIG. 6 illustrates an example of an image correction processing result according to the first exemplary embodiment.

Effects of the image correction processing in the first and the second image correction modes will be described below with reference to FIG. 6.

Figure 5:
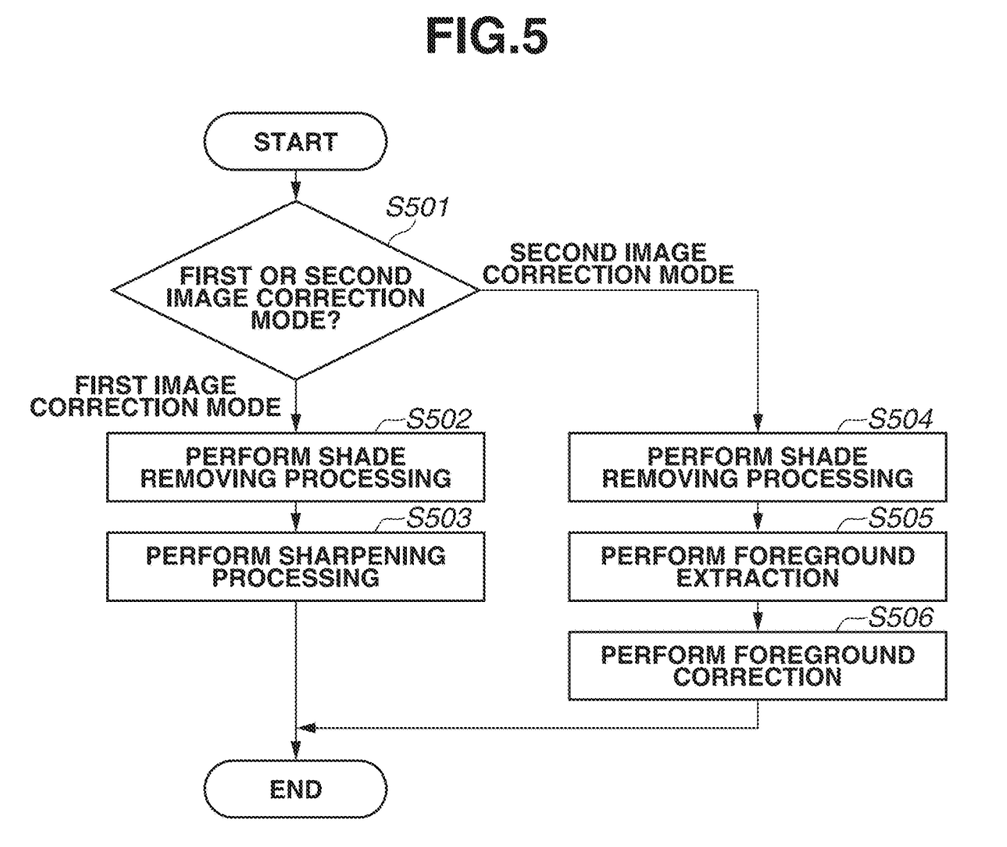
FIG. 5 is a flowchart illustrating image correction processing according to the first exemplary embodiment.

Images 601 and 602 are input images described in the flowchart illustrated in FIG. 5 (images having undergone the distortion correction obtained in step S304 illustrated in FIG. 3). The input image 601 is an example of a captured image of a form document as a subject. The input image 601 includes a corporate logo 607 expressed in gradation and non-white background areas 608 and 609. The input image 602 is an example of a captured image of a white board as a subject. The input image 602 includes a text portion 616 drawn with a black marker, a text portion 617 drawn with a red marker, and a text portion 618 drawn with a blue marker.

Images 603 and 604 are output images in the first image correction mode obtained as a result of the processing in step S503 illustrated in FIG. 5. The output images 603 and 604 represent the result of outputting the input images 601 and 602, respectively. Output images 605 and 606 are output images in the second image correction mode obtained as a result of the processing in step S506 illustrated in FIG. 5. The output images 605 and 606 represent the results of outputting the input images 601 and 602, respectively.

In the first image correction mode, a background area which cannot be corrected into white, like a background area 622, may appear in an image including steep density differences. However, illumination unevenness included in the image can be removed while the luminance of non-white background areas 611 and 612 is maintained. Since text replacement or monochromatization is not performed, it is possible to perform correction processing while maintaining similarity of a corporate logo 610 expressed in gradation to the document and maintaining visibility of the corporate logo 610.

In the second image correction mode, text portions may be replaced or monochromatized through foreground extraction, areas expressed in gradation are replaced or monochromatized, as indicated by a logo 613. This means that the logo 613 is different in appearance from the logo 607 to a large extent in comparison with the logo 610 in the output image 603. On the other hand, text portions 623, 624, and 625 drawn with different color markers are unified into an applicable single color and, therefore, can be improved in visibility to a large extent in comparison with text portions 619, 620, and 621. When the shade removing processing is performed to increase the luminance of background areas, even non-white background areas 614 and 615 may be corrected into white. However, as indicated by a background area 626, background areas can be suitably corrected even in an image including steep density differences in background portions.

According to the present exemplary embodiment, in correction of a captured image, it is possible to select either replacing or monochromatizing or not replacing or monochromatizing foreground portions according to a user instruction. This makes it possible to output a replaced or monochromatized image to an output destination and to output an image not replaced or monochromatized to the output destination.

Although, in the present exemplary embodiment, a user instruction determines which of a replaced or monochromatized image or an image not replaced or monochromatized is to be output to an output destination, both images may be output to the output destination. In this case, the user only needs to delete either one unnecessary image afterwards. What is important is that the portable terminal according to the present exemplary embodiment is able to output both images to the output destination.

According to the first exemplary embodiment, the CPU 201 changes an operation between performing foreground replacement or monochromatization (ON) and not performing foreground replacement or monochromatization (OFF). According to the present exemplary embodiment, the CPU 201 performs not only processing for turning the foreground replacement or monochromatization ON and OFF but also processing for changing the method for extracting foreground portions when turning ON the replacement or monochromatization. The following describes only differences from the first exemplary embodiment.

<Detailed Description of Image Correction Processing (S305) According to Second Exemplary Embodiment>

Figure 7:
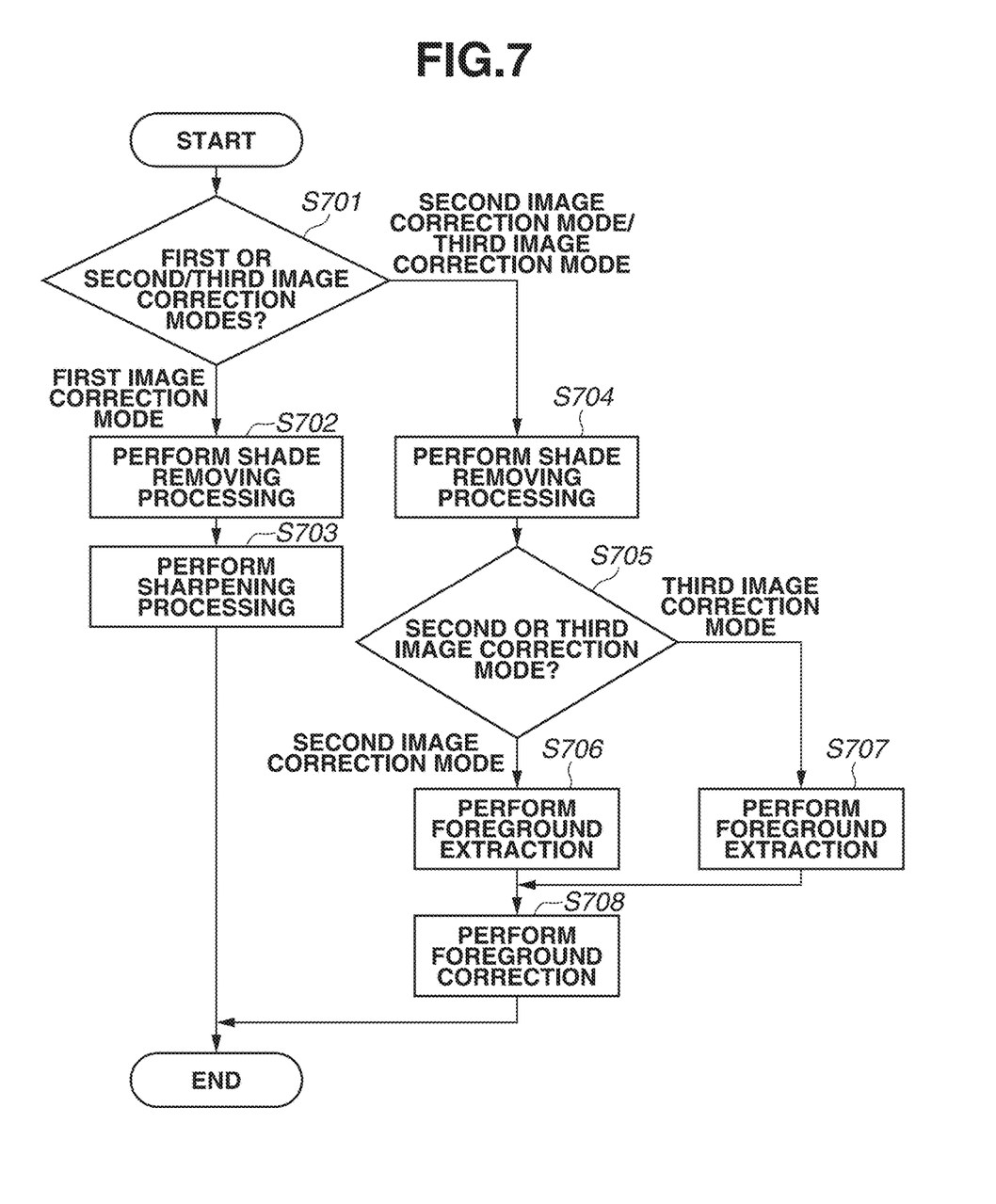
FIG. 7 is a flowchart illustrating image correction processing according to a second exemplary embodiment.

FIG. 7 is a flowchart illustrating a processing procedure performed as the image correction processing in step S305 illustrated in FIG. 3 according to the present exemplary embodiment.

In step S701, the CPU 201 acquires the image correction mode to determine the current mode. In a case where the acquired image correction mode is the first image correction mode (FIRST IMAGE CORRECTION MODE in step S701), the processing proceeds to step S702. On the other hand, in a case where the acquired image correction mode is the second or the third image correction mode (SECOND IMAGE CORRECTION MODE/THIRD MAGE CORRECTION MODE in step S701), the processing proceeds to step S704.

Processing in steps S702 to S704 is similar to the processing in steps S502 to S504 illustrated in FIG. 5.

In step S705, the CPU 201 acquires the image correction mode to determine the current mode. In a case where the acquired image correction mode is the second image correction mode (SECOND IMAGE CORRECTION MODE in step S705), the processing proceeds to step S706. On the other hand, in a case where the acquired image correction mode is the third correction mode (THIRD IMAGE CORRECTION MODE in step S705), the processing proceeds to step S707. The CPU 201 determines whether a specification regarding the foreground replacement or monochromatization by the user is the first specification or the second specification.

In step S706, the CPU 201 performs similar processing to step S505 illustrated in FIG. 5.

In step S707, the CPU 201 performs the foreground extraction processing for extracting foreground portions such as text portions from the input image (image having undergone the distortion correction). The foreground extraction processing in step S707 differs from the foreground extraction processing in step S706 (step S505) in a threshold value map to be used. In step S707, to extract a faint text having pixel values close to pixel values of the threshold value map as a foreground portion, the CPU 201 uses a threshold value map in which pixel values of the threshold value map used in step S706 are uniformly incremented by 5. This makes it possible to extract a larger number of areas as foreground portions than in step S706. For example, a faint text portion not extracted in step S706 will be extracted as a foreground portion. It may be only required to obtain, from the threshold value map used in this step, a foreground extraction result different from the foreground extraction result in step S706. Therefore, the pixel values of the threshold value map do not necessarily need to be uniformly incremented by 5 from the pixel values of the threshold value map used in step S706. The threshold values of the threshold value map used in the foreground extraction in step S706 may be uniformly decremented, or a threshold value map obtained through a different algorithm from the algorithm in step S706 may be used. More specifically, the portable apparatus according to the present exemplary embodiment may provide variable foreground extraction levels by implementing steps S706 and S707.

Processing in step S708 is similar to the processing in step S506 illustrated in FIG. 5.

The threshold value map to be used in the foreground extraction implemented in steps S705 to S707 may not necessarily be changed according to the correction mode as long as the map is changed by an instruction issued via the operation unit 208 by the user. For example, it is also possible to receive a specified adjustment amount of a threshold value from a reference value by using a slider bar, and adjust the threshold value map according to the specified adjustment amount before performing the foreground extraction.

Figure 8:
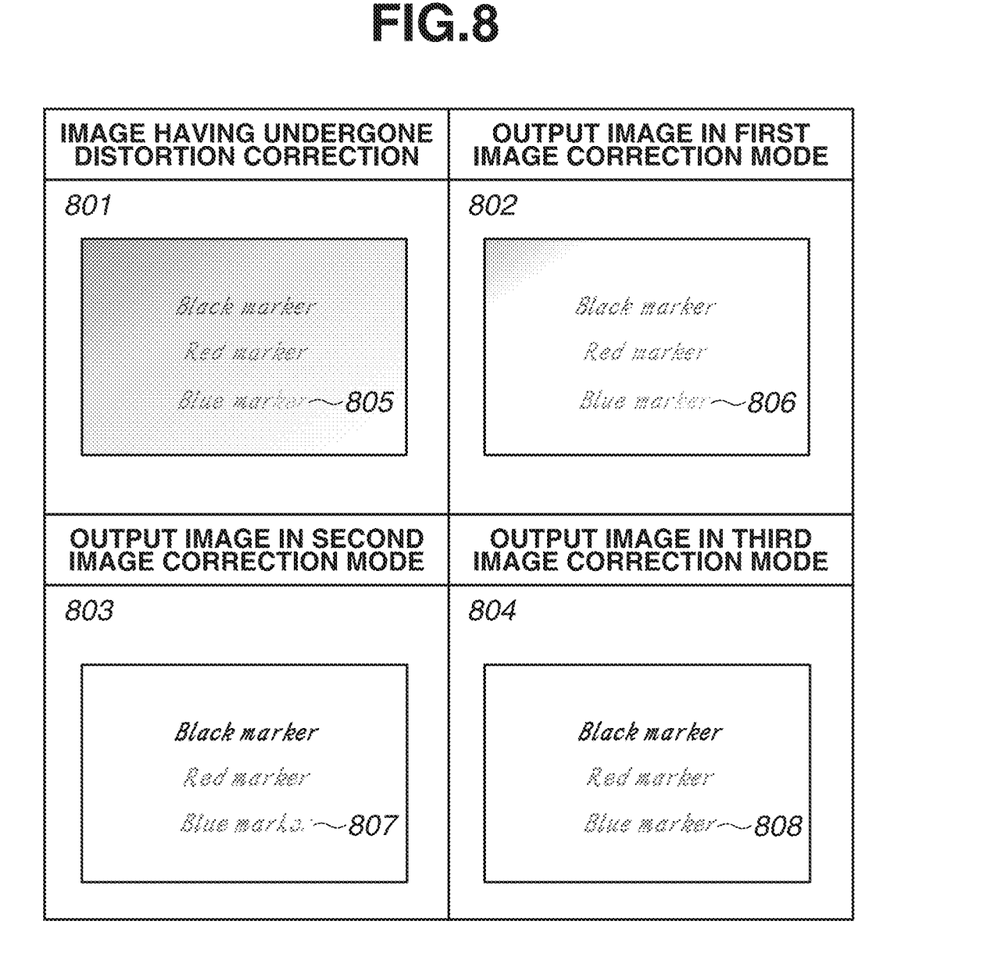
FIG. 8 illustrates an example of an image correction processing result according to the second exemplary embodiment.

Effects of the image correction processing in a third image correction mode according to the present exemplary embodiment will be described below with reference to FIG. 8.

An image 801 is an image having undergone the distortion correction obtained in step S304 illustrated in FIG. 3, and is an input image having undergone the image correction processing. The input image 801 is an example of a captured image of a white board as a subject, and includes a text portion 805 drawn with a faint marker. An image 802 is an output image in the first image correction mode obtained as a result of the processing in step S703 illustrated in FIG. 7. Images 803 and 804 are output images obtained as a result of the processing in step S708 when the second and the third image correction modes are acquired in step S705 illustrated in FIG. 7, respectively.

As indicated by a text portion 806, in the first image correction mode, a faint text portion having a luminance close to that of the background area becomes faint in color after the shade removing processing. As indicated by a text portion 807, in the second image correction mode, the foreground extraction through binarization may fail. However, in the third image correction mode, by uniformly incrementing the pixel values of the threshold value map used for the foreground extraction, it becomes possible to extract, as a foreground portion, a faint text portion having a small difference in luminance from the background area.

As described above, according to the second exemplary embodiment, it is possible to change the result of the foreground extraction subjected to the replacement or monochromatization not only by turning the foreground replacement or monochromatization ON and OFF but also by changing the binarization threshold value parameter for the foreground extraction according to a user's specification. This makes it possible to provide the user with an image having improved visibility also for a foreground portion having a small difference in luminance from the background area, such as a text portion drawn with a faint pen or marker.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-101110, filed May 22, 2017, which is hereby incorporated by reference herein in its entirety.

What is claimed is:

1. An image processing apparatus comprising:
a memory that stores a program; and
a processor that executes the program to perform:
acquiring an image;
determining which of a first mode and a second mode is set;
performing a first image processing on the acquired image in a case where it is determined that the first mode is set;
outputting the image having undergone the first image processing in a case where it is determined that the first mode is set;
performing a second image processing on the acquired image in a case where it is determined that the second mode is set; and
outputting the image having undergone the second image processing in a case where it is determined that the second mode is set,
wherein the first image processing comprises:
a first removing processing for removing illumination unevenness and/or brightness unevenness from the acquired image; and
a sharpening processing for sharpening on the image having undergone the first removing image; and
wherein the second image processing comprises:
a second removing processing for removing illumination unevenness and/or brightness unevenness from the acquired image;
a foreground extraction processing for extracting foreground areas by performing a binarization process for the image having undergone the second removing process; and
a replacement processing for identifying a text portion and a photographic portion from the extracted foreground areas, and replacing, on the image having undergone the second removing process, a color corresponding to the identified text portion with one color that is selected from a plurality of predetermined different colors based on the color corresponding to the identified text portion the color corresponding to the identified text portion meets a range of the one color that is selected from the plurality of predetermined different colors, wherein the replacing is not performed for the identified photographic portion on the image having undergone the second removing process; and
wherein the replacement processing further replaces, on the image having undergone the second removing process, the color corresponding to the identified text portion with the average color of the identified text portion of the color corresponding to the identified text portion meets none of the ranges of the plurality of determined different colors.

2. The image processing apparatus according to claim 1, wherein the first mode or the second mode is set based on a user instruction.

3. The image processing apparatus according to claim 1, wherein the predetermined different colors are representable colors for white board markers.

4. The image processing apparatus according to claim 3, wherein the representable colors include black, red, blue and green.

5. The image processing apparatus according to claim 1, wherein the output destination is an output destination specified by a user.

6. The image processing apparatus according to claim 1, wherein the first and second removing processing are performed for the acquired image based on pixel value correction information acquired by dividing the acquired image into blocks and analyzing brightness information for each block, and wherein sizes of blocks divided in the second removing processing are smaller than sizes of blocks divided in the first removing processing.

7. The image processing apparatus according to claim 6, wherein the processor further performs a geometric correction processing for performing geometric correction on a part of an image to be processed, wherein the first or second image processing is performed on the image having undergone the geometric correction.

8. The image processing apparatus according to claim 1, wherein the image processing apparatus further comprises a camera that captures an image of a subject, and wherein the acquired image is an image captured by the camera.

9. An image processing method executed by an image processing apparatus, the method comprising:
acquiring an image;
determining which of a first mode and a second mode is set;
performing a first image processing on the acquired image in a case where it is determined that the first mode is set;
outputting the image having undergone the first image processing in a case where it is determined that the first mode is set;
performing a second image processing on the acquired image in a case where it is determined that the second mode is set; and
outputting the image having undergone the second image processing in a case where it is determined that the second mode is set;
wherein the first image processing comprises:
a first removing processing for removing illumination unevenness and/or brightness unevenness from the acquired image; and
a sharpening processing For sharpening on the image having undergone the first removing image, and
wherein the second image processing comprises:
a second removing processing for removing illumination unevenness and/or brightness unevenness from the acquired image;
a foreground extraction processing for extracting foreground areas by performing a binarization process for the image having undergone the second removing process; and
a replacement processing for identifying a text portion and a photographic portion from the extracted foreground areas, and replacing, on the image having undergone the second removing process, a color corresponding to the identified text portion with one color that is selected from a plurality of predetermined different colors based on the color corresponding to the identified text portion if the color corresponding to the identified text portion meets a range of the one color that is selected from the plurality of predetermined different colors, wherein the replacing is not performed for the identified photographic portions on the image having undergone the second removing process; and wherein the replacement processing further replaces, on the image having undergone the second removing process, the color corresponding to the identified text portion with the average color of the identified text portion if the color corresponding to the identified text portion meets none of the ranges of the plurality of predetermined different colors.

10. A non-transitory storage medium storing a program for causing a computer to perform:

acquiring an image;

determining which of a first mode and a second mode is set;

performing a first image processing on the acquired image in a case where it is determined that the first mode is set;

outputting the image having undergone the First image processing in a case where it is determined that the first mode is set;

performing a second image processing on the acquired image in a case where it is determined that the second mode is set; and outputting the image having undergone the second image processing in a case where it is determined that the second mode is set, wherein the first image processing comprises:

a first removing processing for removing illumination unevenness and/or brightness unevenness from the acquired image; and a sharpening processing for sharpening on the image having undergone the first removing image, and wherein the second image processing comprises:

a second removing processing for removing illumination unevenness and/or brightness unevenness from the acquired image;

a foreground extraction processing for extracting foreground areas by performing a binarization process for the image having undergone the second removing process; and a replacement processing for identifying a text portion and a photographic portion from the extracted foreground areas, and replacing, on the image having undergone the second removing process, a color corresponding to the identified text portion with one color that is selected from a plurality of predetermined different colors based on the color corresponding to the identified text portion if the color corresponding to the identified text portion meets a range of the one color that is selected from the plurality of predetermined different colors, wherein the replacing is not performed for the identified photographic portions on the image having undergone the second removing process; and wherein the replacement processing further replaces, on the image having undergone the second removing process, the color corresponding to the identified text portion with the average color of the identified text portion if the color corresponding to the identified text portion meets none of the ranges of the plurality of predetermined different colors.

* * * * *